United States Patent
Kasbarian et al.

(10) Patent No.: US 7,375,481 B2
(45) Date of Patent: May 20, 2008

(54) METHOD OF CONTROLLING MOTOR THERMAL PROTECTION FOR AN ELECTRIC POWER STEERING SYSTEM OF A MOTOR VEHICLE

(75) Inventors: Jean-Marc Kasbarian, Lyons (FR); Virginie Perichon, Lyons (FR); Bertrand Rousseau, Villeurbanne (FR)

(73) Assignee: JTEKT Europe, Irigny (FR)

( * ) Notice: Subject to any disclaimer, the term of this patent is extended or adjusted under 35 U.S.C. 154(b) by 117 days.

(21) Appl. No.: 10/546,250

(22) PCT Filed: Feb. 16, 2004

(86) PCT No.: PCT/FR2004/000350

§ 371 (c)(1),
(2), (4) Date: Nov. 8, 2005

(87) PCT Pub. No.: WO2004/076260

PCT Pub. Date: Sep. 10, 2004

(65) Prior Publication Data

US 2006/0103337 A1 May 18, 2006

(30) Foreign Application Priority Data

Feb. 20, 2003 (FR) .................................. 03 02085

(51) Int. Cl.
 H02P 1/18 (2006.01)
 B62D 5/04 (2006.01)
(52) U.S. Cl. ...................... 318/254; 318/432; 318/434; 318/471; 180/446
(58) Field of Classification Search ................ 318/430, 318/434, 471, 489, 254, 432; 180/446; 701/41
See application file for complete search history.

(56) References Cited

U.S. PATENT DOCUMENTS

| 4,785,901 | A |   | 11/1988 | Maeda |
| 5,086,859 | A |   | 2/1992  | Takahashi et al. |
| 5,219,035 | A |   | 6/1993  | Tsurumiya et al. |
| 5,525,881 | A | * | 6/1996  | Desrus ........................ 318/471 |
| 5,729,107 | A | * | 3/1998  | Shimizu et al. ............. 318/489 |
| 6,026,926 | A | * | 2/2000  | Noro et al. .................. 180/446 |
| 6,268,708 | B1 |   | 7/2001  | Kawada et al. |
| 6,439,336 | B2 | * | 8/2002  | Noro et al. .................. 180/404 |
| 6,470,995 | B2 | * | 10/2002 | Mukai et al. ................ 180/446 |

(Continued)

FOREIGN PATENT DOCUMENTS

EP    1 167 158 A1    1/2002

(Continued)

*Primary Examiner*—Paul Ip
(74) *Attorney, Agent, or Firm*—Oliff & Berridge, PLC

(57) ABSTRACT

The invention relates to motor vehicles which are equipped with an electric power steering system. Using a known method, the value of the maximum current that is allowed to travel through the electric assist motor is calculated at each instant (t), and a threshold value is determined for said maximum calculated current. Once the value of the maximum calculated current at each instant reaches the threshold value, a gradually-decreasing percentage is applied to the assist current calculated as a function of the torque (C) applied to the steering wheel. In this way, the assist current is reduced before the assist motor thermal protection procedure is activated, such that the driver is not surprised by a sudden lack of power assistance.

5 Claims, 3 Drawing Sheets

U.S. PATENT DOCUMENTS

| | | | |
|---|---|---|---|
| 6,543,572 B2* | 4/2003 | Mukai et al. | 180/446 |
| 6,548,975 B2* | 4/2003 | Kleinau et al. | 318/434 |
| 6,681,165 B2* | 1/2004 | Shibasaki et al. | 701/41 |
| 6,751,538 B2* | 6/2004 | Endo | 701/41 |
| 6,860,361 B2* | 3/2005 | Takatsuka et al. | 180/446 |
| 6,902,028 B2* | 6/2005 | Takatsuka et al. | 180/446 |
| 2002/0179363 A1* | 12/2002 | Takatsuka et al. | 180/446 |
| 2002/0189893 A1* | 12/2002 | Mukai et al. | 180/446 |
| 2003/0001533 A1* | 1/2003 | Kleinau et al. | 318/434 |
| 2003/0045981 A1* | 3/2003 | Kifuku et al. | 701/41 |
| 2003/0120404 A1* | 6/2003 | Endo | 701/41 |
| 2004/0026161 A1* | 2/2004 | Takatsuka et al. | 180/446 |
| 2004/0064228 A1* | 4/2004 | Yamamoto et al. | 701/41 |
| 2004/0222037 A1* | 11/2004 | Takatsuka et al. | 180/446 |
| 2006/0201736 A1* | 9/2006 | Fardoun et al. | 180/446 |

FOREIGN PATENT DOCUMENTS

FR  2 810 614 A1  12/2001

* cited by examiner

METHOD OF CONTROLLING MOTOR THERMAL PROTECTION FOR AN ELECTRIC POWER STEERING SYSTEM OF A MOTOR VEHICLE

BACKGROUND OF THE INVENTION

The present invention relates, generally, to motor vehicles equipped with electric power steering. This invention relates, more particularly, to a sophisticated method of controlling the thermal protection for the electric motor of such a power steering system.

In a power steering system of this type, an electric motor is used to apply a torque or a force to the steering column or to the steering pinion or even to the rack, to assist the movement imparted on the steering wheel by the driver of the vehicle, in each change of direction, parking or avoidance maneuver. When the power steering is required, an electric current of relatively high intensity passes through the windings of the electric assist motor.

Thus, in a long journey punctuated by turns, the electric power steering motor can become hot. If the heating becomes intense and prolonged, there is a risk of damaging, or even destroying, the electric assist motor.

To avoid this risk, thermal protection is provided, in a known manner, to protect the motor against excessive overheating. In particular, depending on parameters, some of which are supposed to describe the thermal state of the motor, a maximum current that can be sent to feed this motor, to drive it, is calculated at each instant.

More particularly, at each instant, depending on the torque applied manually to the steering wheel by the driver, an assist current is calculated to feed the electric assist motor, in order to assist the movement imparted by the driver in optimum conditions. When this calculated current is greater than the maximum current determined elsewhere, the set point current of the motor is chosen to be equal to the maximum calculated current.

DESCRIPTION OF THE PRIOR ART

The implementation of a current limiting function, to provide thermal protection for an electric assist motor, is described, for example, in U.S. Pat. Nos. 4,785,901 and 5,086,859, or even in French patent 2 810 614 in the name of the Applicant, in which provision is made in particular to reduce or limit the intensity of the current passing through the motor, according to the rotation angle of the steering wheel, when approaching the full lock position. U.S. Pat. No. 6,026,926 could also be cited as an example, wherein the assist current is reduced once the motor current and motor rotation speed threshold values have been crossed, when the electric motor is in a declared "overload" state.

In the case of a "brushless" type electric motor, the thermal protection procedure is invoked abruptly, and only for torques applied to the steering wheel which exceed a certain value, this because of the corresponding current value. Thus, the driver of the vehicle can feel, on the steering wheel, a sudden lack of assistance, which takes him by surprise if there is then a need for strong assistance, This can be dangerous in the case where the driver abruptly feels the need to avoid an obstacle encountered on the road. If the driver then applies to the steering wheel the torque that he is used to applying when the assistance is normal, that is not degraded, and the assistance is then reduced because of the intervention of the thermal protection procedure, this driver will have a certain reaction time to compensate for the sudden lack of assistance with which he is confronted, which presents a danger.

Furthermore, with the current thermal protection procedure for a brushless electric motor, the driver will actually feel the activation of this procedure on the steering wheel.

The object of the present invention is to avoid the drawbacks described above, and therefore to make more gradual the limiting of the assistance for the purposes of preventive thermal protection of the electric assist motor, to prevent the driver from feeling, on the steering wheel, abrupt changes likely to take him by surprise and create dangerous situations.

SUMMARY OF THE INVENTION

To this end, the main object of the invention is to devise a sophisticated method of controlling thermal protection of the motor for an electric power steering system of a motor vehicle, in which;

according to a motor thermal protection method known per se, a value of the maximum current allowed to travel through the electric assist motor is calculated at each instant;

and a threshold value is determined for this maximum calculated current;

once the value of the maximum calculated current at each instant reaches the above mentioned threshold value, a percentage decreasing gradually over time is applied to the assist current calculated as a function of the torque applied to the steering wheel.

Thus, the basic idea of the invention consists in producing a gradual "damping" of the current sent to the electric assist motor, therefore of the assistance force itself, before the actual thermal protection method is activated. The driver of the vehicle therefore feels an increasing reduction in assistance, whatever the torque applied to the steering wheel, and will therefore be warned of the impending activation of the thermal protection for the electric assist motor. In particular, the driver will be alerted, in the event of unpredictable abrupt maneuvers, so avoiding the hazardous situations described previously.

An important aspect of the invention is the gradual nature of the reduction in the assistance. This means that once the chosen threshold is reached, a certain percentage (or fraction) of the assist current calculated to "normally" feed the motor will be automatically applied, as a function of the torque applied to the steering wheel, this percentage being decreasing (in other words, the degree of damping is increasing) over time, in such a way that the motor thermal protection procedure cuts in smoothly.

In particular, for the method that is the object of the invention to be able to generate a gradual loss of assistance, the damping law, that is the function giving the percentage reduction of the assist current, will advantageously take the form 1/u.

BRIEF DESCRIPTION OF THE DRAWINGS

FIG. 1 of the appended schematic drawing summarizes the concept of the invention, while

$$K \times \left( \frac{1}{\text{maximum current }(t)} - \frac{1}{\text{threshold}} \right)$$

The coefficient K is programmable here to obtain a higher or lower damping percentage. In the same way, the threshold value is programmable, in order to be able to initiate the assistance reduction earlier or later, depending on whether priority is given to warning the driver of the next time the electric assist motor thermal protection is to cut in, or on the contrary to retaining the maximum steering assistance power for as long as possible.

It will be noted that the method of the invention is such that, when the thermal protection is active, even the low torques applied to the steering wheel are attenuated, so as not to take the driver by surprise, and that he therefore knows, at all times, that the power steering motor remains in thermal protection mode.

Another advantage of the method that is the object of the invention, lies in the fact that, because of the gradual reduction in assistance, the intervention of the thermal protection is delayed, so prolonging the assistance, even though the latter is reduced.

The following FIGS. 3 to 6 illustrate more particular aspects of the invention, compared with the case of a simple thermal protection, without implementation of the present invention.

Figure 1:
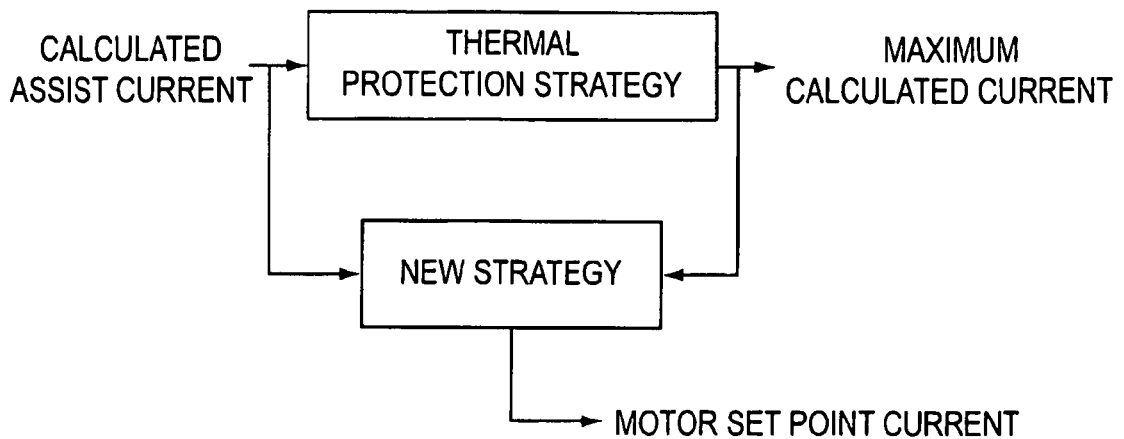
Figure 2:
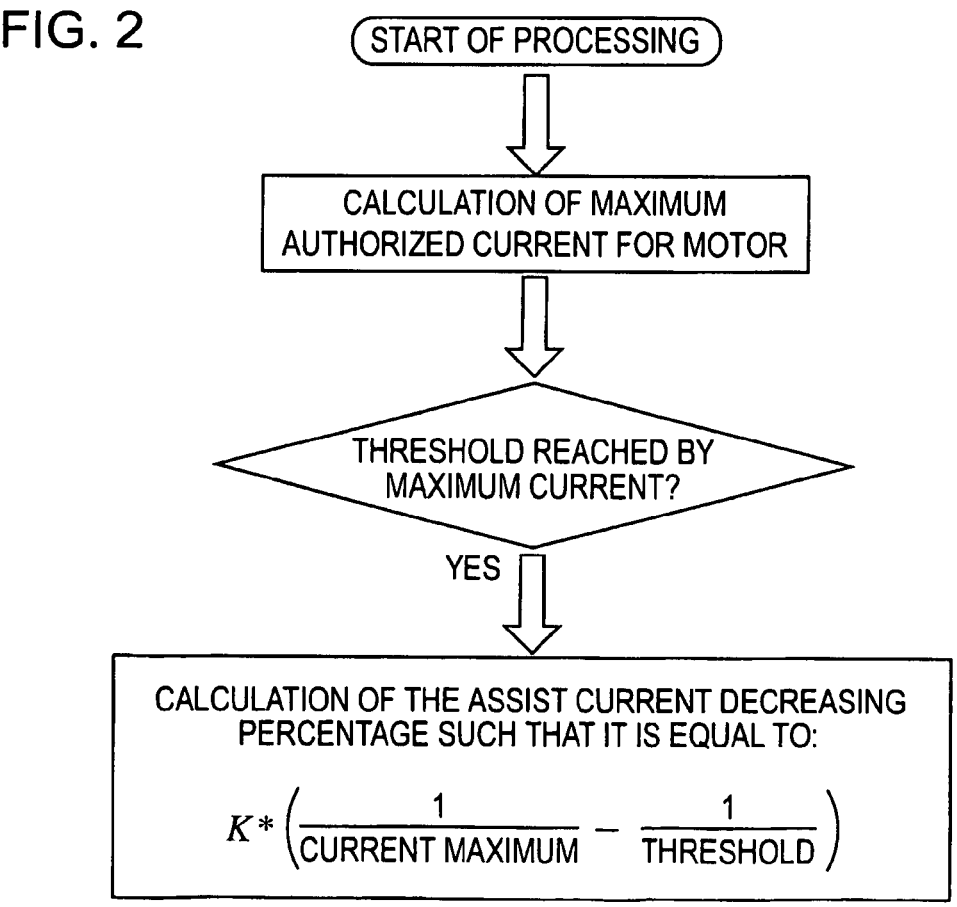
FIG. 2 illustrates more precisely, in algorithm form, the principle implemented, by indicating, as an example, a formula that can be used to calculate the percentage reduction of the assist current, once the threshold value is reached, namely.
Figure 3:
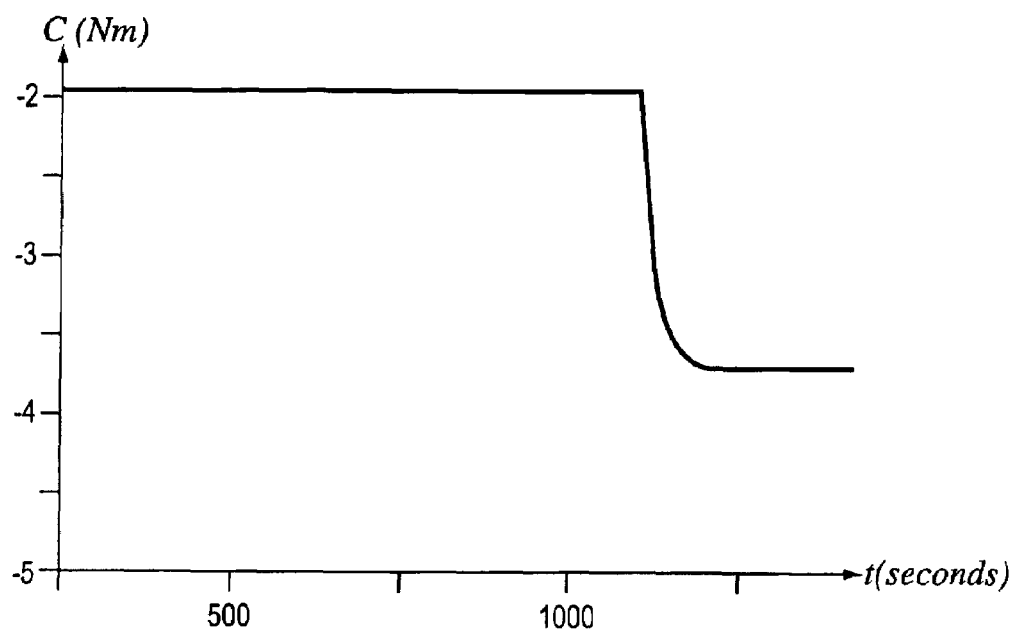

As is illustrated in FIG. 3, in which the time t (in seconds) is given on the x axis and the torque C (in this case negative), expressed in Nm, is given on the y axis, with a conventional thermal protection strategy, when a fixed angle is maintained on the steering wheel and the electric assist motor thermal protection phase cuts in, the torque C that the driver must apply to the steering wheel increases abruptly (as an absolute value), according to the time t.

Figure 4:
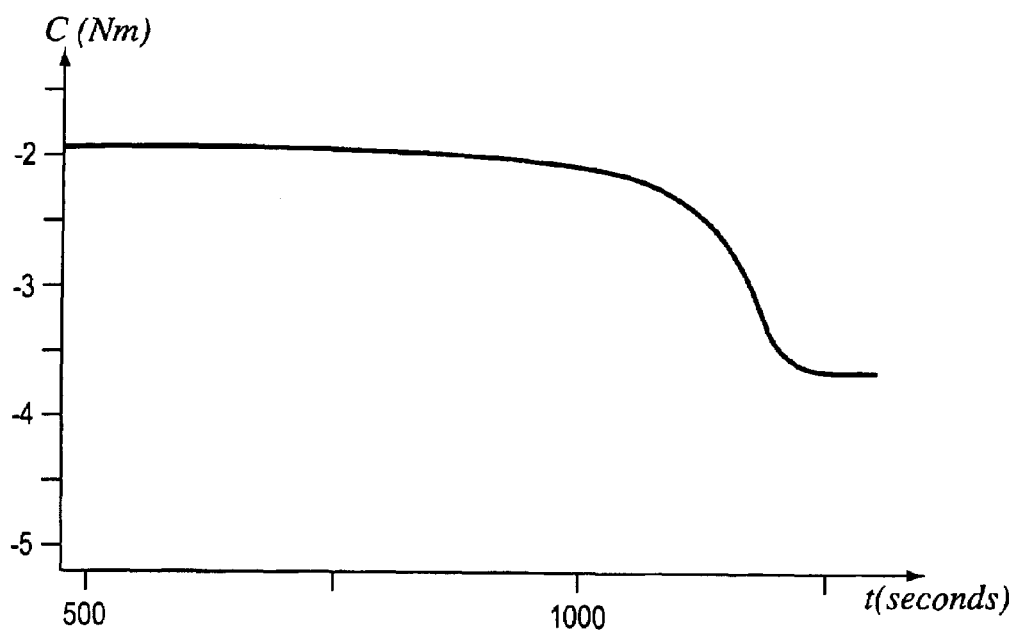

In the context of the present invention, and as is illustrated similarly in FIG. 4, when a fixed angle is maintained on the steering wheel, from a certain instant t1 corresponding to the moment where the threshold is reached, the torque C on the steering wheel begins to increase gradually (as an absolute value) according to the time and so, when the electric assist motor thermal protection cuts in, the driver is already warned of it. It will be noted that the torque C to be applied must here be increased, to retain the initial angle of the steering wheel. Furthermore, the appearance of the curve C=f(t) shows that the thermal protection cuts in less abruptly, and a little later.

Figure 5:
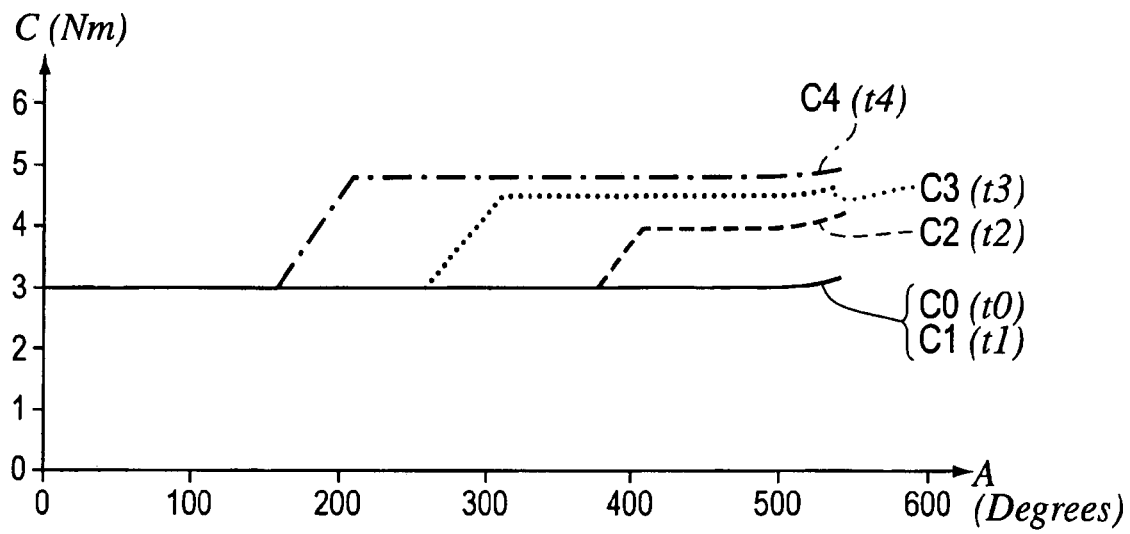
Figure 6:
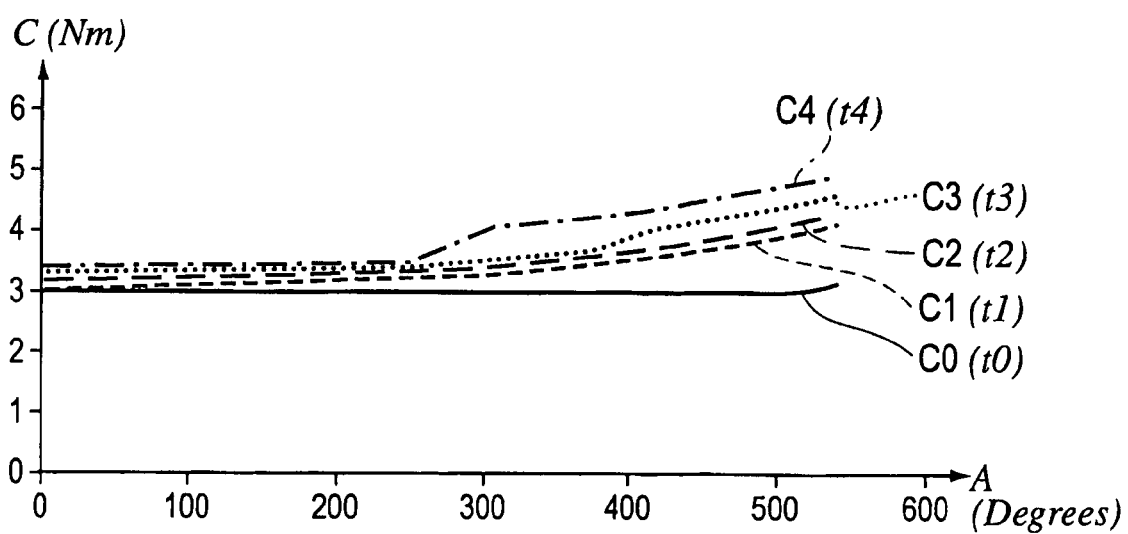

Similarly, FIGS. 5 and 6 illustrate the variation of the torque C (in this case, positive), expressed in Nm, according to the angle A of the steering wheel, in degrees, and for successive times t0, t1, t2, etc.

FIG. 5 relates to the case of a conventional thermal protection. For the times t0 and t1, the thermal protection remains inactive and the torque C0 or C1 varies in the same way. For a time t2, the thermal protection becomes active, and an abrupt increase in the torque C2 is then observed, from a certain angle A value, for example approximately 400 degrees. In these conditions, the driver already senses a steering anomaly, and the strong force to be supplied to the steering wheel can prevent the turn being made in the requisite time, in particular to avoid an obstacle. At the later time t3, the thermal protection is still active, but increasingly restrictive, that is, the torque C3 increases abruptly for a smaller angle A value, for example of approximately 250 degrees A similar, but more aggravated behavior is observed at the later time t4, with a torque C4 which increases abruptly when the angle A reaches, for example, a value of approximately 150 degrees.

FIG. 6, similar to FIG. 5, relates to the method of the present invention. For the time t0, the torque C0 remains roughly constant when the angle A increases, the thermal protection remaining inactive, as with the particular assistance reduction method according to the invention (the threshold value not having been reached). At the time t1, greater than the time t0, the new strategy becomes active, in other words, a perceptible increase in the torque C1 is observed. Similarly, the torque C2 continues to increase, at the time t2, without the thermal protection becoming active, because there is a delay in the activation of the thermal protection. The latter is initiated only at the later time t3, for which the torque C3 presents a "jump", for example from an angle A of approximately 400 degrees. The "Jump" in the torque C3 is, however, in this case significantly smaller and less abrupt than that observed with a simple thermal protection (as in the case of the preceding figure) and, furthermore, the driver of the vehicle has been given gradual warning by the increase in the torque imposed, according to the invention, before the thermal protection cuts in. Finally, at the later time t4, the torque C4 increases for a smaller angle A value, for example of the order of 250 degrees, but still with a reduced and less abrupt "jump".

There would be no departure from the scope of the invention, as defined in the appended claims, in particular by modifying the law applied to reduce the assistance from a certain threshold.

The invention claimed is:

1. A method of controlling motor thermal protection for an electric power steering system of a motor vehicle, the electric power steering system including a steering wheel and an electric assist motor, the method comprising:
   calculating, at each instant, a value of the maximum current allowed to travel through the electric assist motor;
   determining a threshold value for the maximum calculated current; and
   once the value of the maximum calculated current reaches the threshold value, gradually decreasing over time a percentage of an assist current normally applied to the electric assist motor to thermally protect the motor, wherein the assist current is calculated based at least on a torque applied to the steering wheel.

2. The method as claimed in claim 1, wherein the percentage reduction of the assist current decreases over time to provide a gradual loss of the assist current.

3. The method as claimed in claim 2, wherein, once the threshold value is reached by the maximum calculated current, the percentage reduction of the assist current is calculated based at least on a coefficient that is programmable to obtain a higher or lower percentage reduction.

4. The method as claimed in claim 3, wherein once the threshold value is reached by the maximum calculated current, the percentage reduction of the assist current is calculated based at least an a threshold value that is programmable to initiate the reduction earlier or later.

5. The method as claimed in claim 1, wherein low torques applied to the steering wheel also are attenuated.

* * * * *